United States Patent
Wang et al.

(10) Patent No.: US 11,860,597 B2
(45) Date of Patent: Jan. 2, 2024

(54) SMART SWITCH SYSTEM

(71) Applicant: Chengdu Monolithic Power Systems Co., Ltd., Chengdu (CN)

(72) Inventors: Xingwei Wang, Chengdu (CN);
Cheng-Chung Yang, New Taipei (CN);
I-Fan Chen, New Taipei (CN);
Xiuhong Guo, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 68 days.

(21) Appl. No.: 17/533,834

(22) Filed: Nov. 23, 2021

(65) Prior Publication Data
US 2022/0163935 A1  May 26, 2022

(30) Foreign Application Priority Data
Nov. 24, 2020  (CN) .......................... 202011329020.5

(51) Int. Cl.
*G05B 19/042* (2006.01)
*H02H 9/02* (2006.01)

(52) U.S. Cl.
CPC .............. *G05B 19/042* (2013.01); *H02H 9/02* (2013.01); *G05B 2219/21155* (2013.01); *G05B 2219/2639* (2013.01)

(58) Field of Classification Search
CPC ........ G05B 19/042; G05B 2219/21155; G05B 2219/2639; G05B 13/042; G05B 19/05; H02H 9/02
See application file for complete search history.

(56) References Cited

U.S. PATENT DOCUMENTS

| | | | |
|---|---|---|---|
| 2011/0018888 A1* | 1/2011 | Yang | G06F 12/0661 713/600 |
| 2015/0160674 A1* | 6/2015 | Burdette | G06F 13/385 700/295 |
| 2016/0126899 A1* | 5/2016 | Doy | H03F 3/68 330/297 |
| 2016/0182039 A1* | 6/2016 | Xiao | H03K 17/18 307/115 |
| 2017/0170655 A1* | 6/2017 | Nguyen | H03K 17/08122 |

OTHER PUBLICATIONS

Texas Instrument Inc., product INA300 Overcurrent-protection chip, datasheet published in Feb. 2014, [online], [retrieved on Jan. 12, 2023], retrieved from <https://www.ti.com/lit/ds/symlink/ina300.pdf?ts=1673601079635&ref_url=https%253A%252F%252Fwww.google.com%252F> (Year: 2014)*

* cited by examiner

*Primary Examiner* — Charles Cai
(74) *Attorney, Agent, or Firm* — Perkins Coie LLP

(57) ABSTRACT

A smart switch system comprising one or more switching devices. Each one of the switching devices include a first pin, a second pin, a current indication pin, a system current limit pin and a power switch for electrically coupling the first pin to the second pin when the power switch is turned on. Each switching device may adaptively adjust an operation current limit value of the switching device based on a system total current limit value received or set at the system current limit pin and a system current indication signal received at the current indication pin.

19 Claims, 6 Drawing Sheets

SMART SWITCH SYSTEM

CROSS-REFERENCE TO RELATED APPLICATION(S)

This application claims the benefit of CN application No. 202011329020.5 filed on Nov. 24, 2020 and incorporated herein by reference.

TECHNICAL FIELD

This disclosure relates generally to electrical circuit, and more particularly but not exclusively relates to switching devices used in electronic equipment.

BACKGROUND

Switching device can be widely used in a variety of applications, for instance, to adjust power transmission by controlling the on and off switching of the switching device.

Switching devices can be used in electronic equipment to connect or disconnect a power supply and its load. Typical applications of these switching devices include removable circuit boards (such as expansion boards), hot-swappable storage devices, and other applications that involve connecting or disconnecting a power supply and its load (such as charging applications meeting the charging protocols USB PD3.0, Type-C, etc.). A typical switching device used in these applications has a first terminal and a second terminal opposite to the first terminal, the first terminal may be connected to the power supply, and the second terminal may be connected to the load. For a specific example, such a switching device can be used to allow hot-swappable disk drives (the load in this example) to draw power from the disk drive bay or motherboard. The switching device can be implemented by using a power transistor. A system using these switching devices usually needs to distribute current to the path where one or more switching devices are located and handle overcurrent conditions according to the current supply capacity of the system's power supply bus.

SUMMARY

There has been provided, in accordance with an embodiment of the present invention, a smart switch system including a plurality of switching devices.

In accordance with an embodiment, each one switching device of the plurality of switching devices comprises a first pin, a second pin, a current indication pin, a system current limit pin and a power switch coupled between the first pin and the second pin, and wherein the current indication pin is configured to receive a system current indication signal indicative of a real-time total output current of the smart switch system, and wherein the system current limit pin is configured to receive or set a system total current limit value ISYSLIM of the smart switch system, and wherein each one switching device of the plurality of switching devices is further configured to adaptively adjust its operation current limit value $I_{CC}$ based on the system total current limit value ISYSLIM and the system current indication signal.

In accordance with an embodiment, each one switching device of the plurality of switching devices is further configured to provide a current sensing signal indicative of a switching current flowing through the power switch to its current indication pin.

In accordance with an embodiment, the current indication pin of each one switching device of the plurality of switching devices is coupled to a resistive device.

In accordance with an embodiment, each one switching device of the plurality of switching devices is further configured to adaptively adjust its operation current limit value $I_{CC}$ to change in a same direction as the system total current limit value ISYSLIM, and is further configured to adaptively adjust its operation current limit value $I_{CC}$ to change in an opposite direction to the system current indication signal.

In accordance with an embodiment, each one switching device of the plurality of switching devices is further configured to receive a system current limit signal at the system current limit pin to set the system total current limit value ISYSLIM.

In accordance with an embodiment, the system current limit signal comprises a voltage signal having a limiting voltage value VSYSLIM indicative of the system total current limit value ISYSLIM.

In accordance with an embodiment, the system current limit signal comprises a current signal having the system total current limit value ISYSLIM, and wherein a resistive device having a resistance value of Rsyslim is coupled to the system current limit pin of each one switching device of the plurality of switching devices to convert the system current limit signal into a voltage signal having a limiting voltage value VSYSLIM indicative of the system total current limit value ISYSLIM, and wherein VSYSLIM=ISYSLIM*Rsyslim.

In accordance with an embodiment, each one switching device of the plurality of switching devices is further configured to be coupled to a resistive device having a resistance value of Rsyslim at the system current limit pin, an internal current source in each one switching device is configured to drive its system current limit pin with a first predetermined current value Iint1 to generate a limiting voltage value VSYSLIM indicative of the system total current limit value ISYSLIM, and wherein VSYSLIM=Iint1*Rsyslim.

In accordance with an embodiment, each one switching device of the plurality of switching devices may comprise an adaptive adjustment module configured to adaptively adjust a current-limiting threshold voltage Vth to change in a same direction as the limiting voltage value VSYSLIM and to change in an opposite direction to the system current indication signal, and wherein the current-limiting threshold voltage Vth is indicative of the operation current limit value $I_{CC}$.

In accordance with an embodiment, the current-limiting threshold voltage Vth is proportional to the operation current limit value $I_{CC}$ of the $i^{th}$ switching device with a predetermined first coefficient K1, and wherein the predetermined first coefficient K1 is greater than zero In accordance with an embodiment, the system current indication signal may comprise a voltage signal VMON, and wherein the adaptive adjustment module is configured to adaptively adjust the current-limiting threshold voltage Vth to satisfy: Vth=K2*VSYSLIM−K3*VMON, and wherein K2 is a predetermined second coefficient greater than zero, and wherein K3 is a predetermined third coefficient greater than zero.

In accordance with an embodiment, the system current limit signal comprises a current signal having the system total current limit value ISYSLIM, and wherein the system current indication signal comprises a voltage signal VMON, and wherein each one switching device of the plurality of switching devices comprises an adaptive adjustment module configured to adaptively adjust the operation current limit value $I_{CC}$ to satisfy: $I_{CC}=K4*ISYSLIM-K5*VMON$, and wherein K4 is a predetermined fourth coefficient greater than zero, and wherein K5 is a predetermined fifth coefficient greater than zero.

In accordance with an embodiment, the system current limit signal comprises a current signal having the system total current limit value ISYSLIM, and wherein the system current limit pins of all the plurality of switching devices are coupled to a single pin of a controller or the system current limit pin of each one of the plurality of switching devices is coupled to a corresponding one pin of a corresponding plurality of pins of a controller.

In accordance with an embodiment, the operation current limit value $I_{CC}$ stops increasing when it reaches a maximum operation current limit value.

In accordance with an embodiment, each one switching device of the plurality of switching devices further comprises a switching current limit setting pin configured to receive or set the maximum operation current limit value.

In accordance with an embodiment, each one switching device of the plurality of switching devices further comprises a priority pin configured or used to set its turn-off priority when an over-current occurs in the smart switch system.

In accordance with an embodiment, each one switching device of the plurality of switching devices further comprises a fault indication pin configured to indicate system faults.

In accordance with an embodiment, a first turn-off priority switching device which is to be turned off at first among the plurality of switching devices when an over-current occurs in the smart switch system is coupled to a first predetermined potential at its priority pin.

In accordance with an embodiment, the first turn-off priority switching device is further configured to set its fault pin at a second predetermined potential in response to its turn-off.

In accordance with an embodiment, if the number of the plurality of switching devices is greater than 1, the priority pin of a second turn-off priority switching device which is to be turned off at second among the plurality of switching devices is coupled to the fault pin of the first turn-off priority switching device, and the second turn-off priority switching device is further configured to set its fault pin at a third predetermined potential in response to its turn-off.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. When an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. The terms "a," "an," and "the" include plural reference, and the term "in" includes "in" and "on". Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example, although it may. Furthermore, the features, structures, or characteristics may be combined in one or more embodiments or examples. In addition, it should be noted that the drawings are provided for illustration, and are not necessarily to scale. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
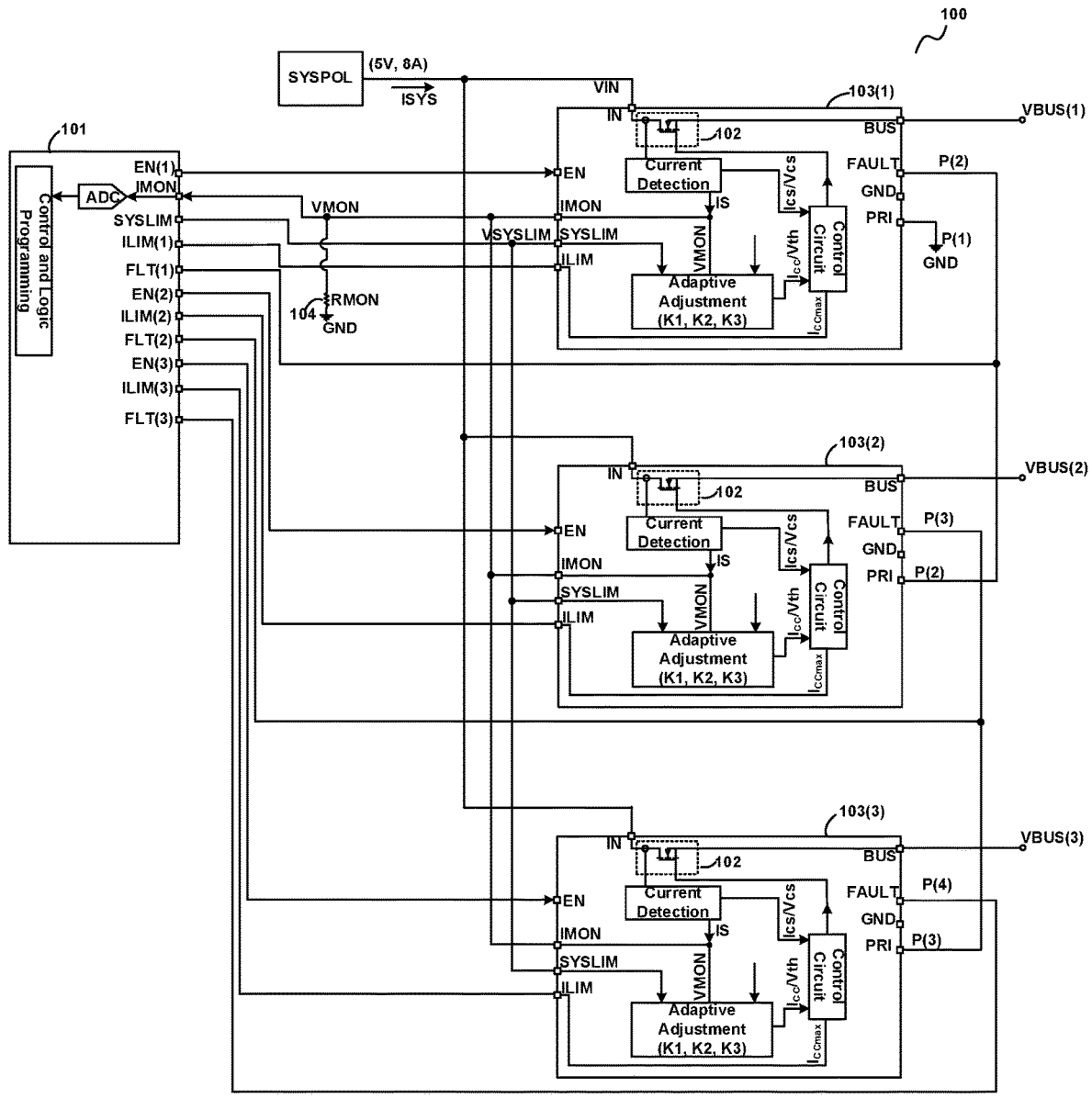
FIG. 1 illustrates a block diagram of a system 100 for connecting a power supply to a load in accordance with an embodiment of the present invention.

FIG. 1 illustrates a block diagram of a system 100 for connecting a power supply to a load in accordance with an embodiment of the present invention. In the example of FIG. 1, the system 100 may comprise a controller 101 and one or more monolithic or single-chip integrated circuit (IC) switching devices 103(i), where i is a positive integer to index and distinguish the switching devices 103(i). In the embodiments of the present disclosure, it is illustrated as including three IC switching devices, respectively labeled with 103(1), 103(2), 103(3), that is, the values of i are 1, 2, and 3 respectively for marking and distinguishing the three IC switching devices. Those skilled in the art should understand that the number of the IC switching devices included in the system 100 can be changed according to actual application requirements (such as the number of loads), and is not limited to three. By extension, the system 100 may include a plurality of N monolithic or single-chip IC switching devices 103(i), where N is a positive integer, and the value of i is traversal from 1 to N, so as to mark and distinguish the N monolithic or single-chip IC switching devices. Those of ordinary skill in the art should understand that the term "a plurality of" herein used is not intended to be exclusively limited to "more than one", but is intended to include "one". It can be considered that FIG. 1 illustrates an example of N=3. Each switching device 103(i) can be used as a "load switch", that is to say, the switching device 103(i) is controllable (for example, it can be controlled by the controller 101), and is integrated with a driving circuit for driving a power switch and a monitoring circuit used to provide the controller with the status of the switching device and the power supply.

In the exemplary embodiment of FIG. 1, for each i from 1 to N (the illustrated embodiment shows an example of N=3), the switching device 103(i) may have a plurality of pins, which may include an IN pin and a BUS pin. The IN pin may be coupled to a system power supply bus SYSPOL for receiving a power supply voltage VIN. The BUS pin may be used to connect to a load. Each switching device 103(i) (i=1, N) may include a power switch (for example, the power switch 102 shown in FIG. 1), such as a field effect transistor (FET). The power switch may have a first terminal (such as a drain terminal) coupled to the IN pin and a second terminal (such as a source terminal) coupled to the BUS pin. Each switching device 103(i) (i=1, N) may further include a power switch gate driving circuit to drive a gate of the power switch to control the power switch to perform on and off switching in a controlled manner. When the power switch is turned on, the power switch electrically couple the IN pin to the BUS pin to transmit the power supply voltage VIN received by the IN pin to the load connected to the BUS pin. When the power switch is turned off, the power switch electrically decouple the IN pin from the BUS pin to stop transmitting the power supply voltage VIN from the IN pin to the load connected to the BUS pin. In the example of FIG. 1, the power supply voltage VIN is illustrated as of 5V, which can provide a power supply current of 8 A. However, those skilled in the art should understand that this is only an example, and the system 100 can also be used to couple other power supplies that provide different voltages and currents to the load.

In the example of FIG. 1, each switching device 103(i) (i=1, N; the illustrated embodiment shows an example of N=3) may further comprise: a FAULT pin that may be configured to indicate system faults (for example: over-temperature fault, over-current fault, over-voltage fault, system short-circuit fault, power switch short-circuit fault, etc.); a GND pin that may be used to couple the switching device 103(i) to a reference ground potential; a EN pin that may be used to enable or disable the switching device 103(i); an IMON pin that may be configured to provide an indication signal indicating an amount of an output current of the switching device 103(i) (for example, an amount of DC current flowing from the input pin IN to the output pin BUS); and an ILIM pin (e.g. a switching current limit setting pin) that may be used to receive or set a current-limiting reference signal.

In the example of FIG. 1, the controller 101 may enable or disable the switching device 103(i) based on the status of the switching device 103(i) (i=1, N; the illustrated embodiment shows an example of N=3). The controller 101 may be configured to receive status indication signals (for example, temperature indication signals, current sensing indication signals, fault indication signals, etc.) from the switching device 103(i) (i=1, N; the illustrated embodiment shows an example of N=3). The controller 101 may be implemented by any general-purpose microprocessor or other single-chip processor, with integrated input/output pins, configurable firmware, and data acquisition or data processing functions. The microprocessor 101 being "general-purpose" may mean that the microprocessor does not need to be specifically designed for and to work with the switching device 103(i), but may include a general-purpose microprocessor or microcontroller elements, such as processors and memory. One of the advantages may include that the switching device 103(i) can be controlled by a general-purpose microcontroller, and there is no need to specially design a dedicated external controller to provide an interface to realize the interaction between the switching device 103(i) and the microcontroller. The switching device 103(i) can be directly controlled by the general-purpose controller 101.

In the example of FIG. 1, the controller 101 may be configured to receive the status indication signals provided by the switching device 103(i) (for each i=1, . . . , N; the illustrated embodiment shows an example of N=3) and to control operation of the switching device 103(i) based on these indication signals. More specifically, the IMON pin and the FAULT pin of the switching device 103(i) (for each i=1, . . . , N) may be coupled to the controller 101 to allow the controller 101 to receive the status indication signals from the aforementioned pins and process these indication signals. For instance, the controller 101 may receive a status indication signal (e.g., an output current indication signal or a switching current indication signal) from a pin (for example, IMON pin) of the switching device 103(i), and send the status indication signal to an analog-to-digital converter ADC to perform analog-to-digital conversion, and then send a digital equivalent of the status indication signal to a control and logic programming circuit for processing. The controller 101 may also be configured and coupled to each switching device 103(i) to detect the power supply voltage VIN and an output voltage VBUS(i) of the switching device 103(i) in a similar manner, wherein i=1, . . . , N and the illustrated embodiment shows an example of N=3.

In the example of FIG. 1, for each i from 1 to N (the illustrated embodiment shows an example of N=3), the FAULT pin of the switching device 103(i) may output a status indication signal in digital form, which may be received by a digital input pin of the controller 101 and then sent to the control and logic programming circuit for processing. In such an embodiment, the status indication signal output by the FAULT pin of the switching device 103(i) is a digital signal, and thus can be processed by the control and logic programming circuit without analog-to-digital conversion.

In the example of FIG. 1, for each i from 1 to N (the illustrated embodiment shows an example of N=3), the controller 101 may have a FLT(i) pin that may be coupled to the FAULT pin of the switching device 103(i). The fault indication signal from the FAULT pin of the switching device 103(i) may indicate whether the switching device 103(i) is operating normally or is malfunctioning. The controller 101 receives and processes the fault indication signal from the FAULT pin of the switching device 103(i) to control the switching device 103(i). For example, when the fault indication signal indicates that the switching device 103(i) has a fault, the controller 101 may control the switching device 103(i) to enter a pull-down mode or disable the switching device 103(i).

In the example of FIG. 1, for each i from 1 to N (the illustrated embodiment shows an example of N=3), the controller 101 may have an EN(i) pin that may be coupled to the EN pin of the switching device 103(i). The controller 101 may be configured to control the switching device 103(i) to be enabled by providing an enable signal to the EN pin of the switching device 103(i). In one embodiment, when the enable signal is active at the EN pin of the switching device 103(i), the switching device 103(i) is enabled and can be operated to couple the input power supply VIN to the load. When the enable signal is not effective at the EN pin of the switching device 103(i), the switching device 103(i) is disabled to disconnect the input power supply VIN from the load. In one embodiment, when the enable signal remains at a predetermined voltage level for a predetermined duration, the switching device 103(i) returns to the pull-down mode, in which the switching device 103(i) pull the output voltage VBUS(i) down (e.g. to the reference ground potential).

Figure 6:
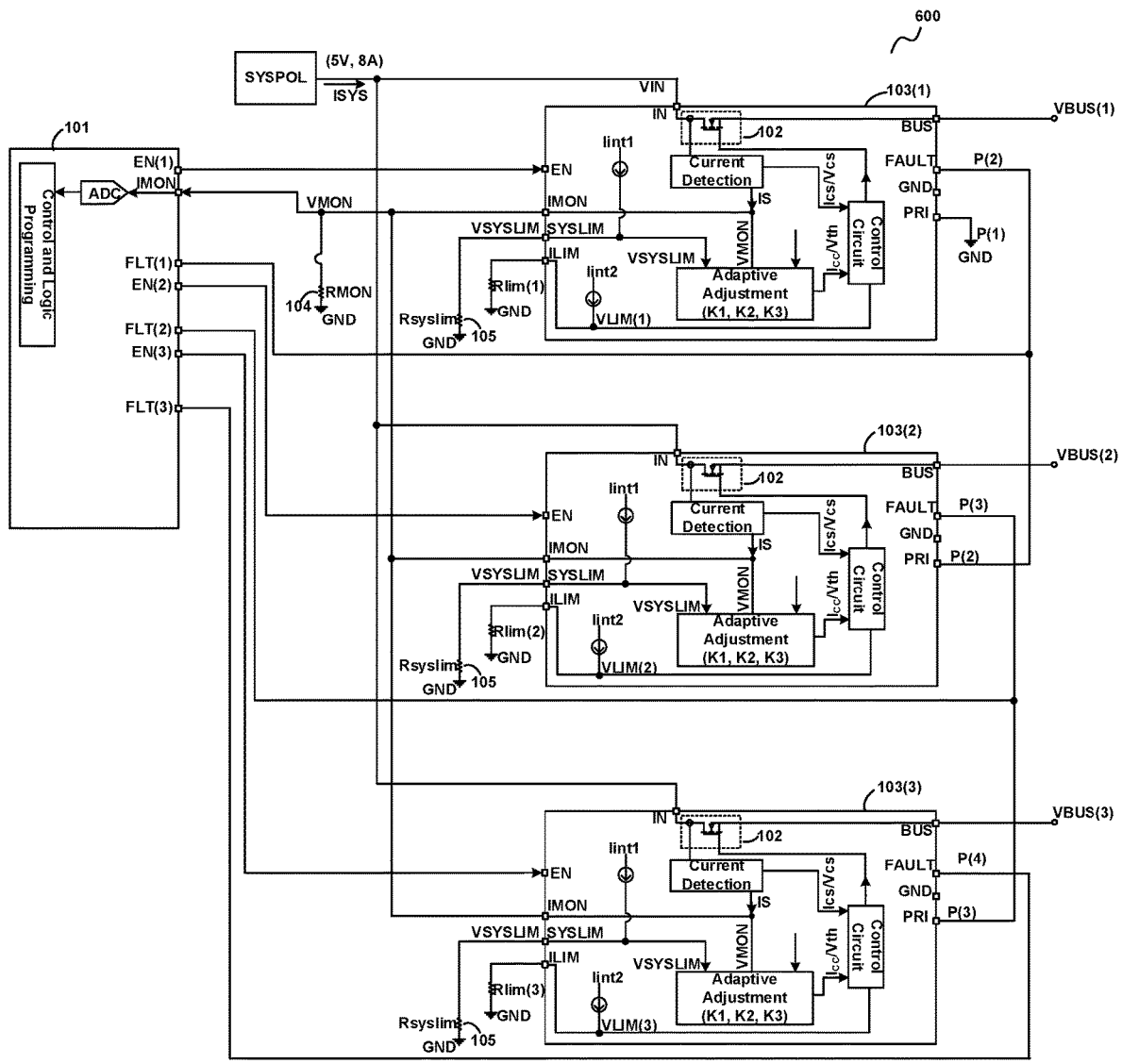
FIG. 6 illustrates a block diagram of a system 600 for connecting a power supply to a load in accordance with an embodiment of the present invention.

In the example of FIG. 1, for each i from 1 to N (the illustrated embodiment shows an example of N=3)(expandable to the case where i traverses the integers from 1 to N, N is a positive integer, the illustrated embodiment in FIG. 1 shows an example of N=3), the control and logic programming circuit may be configured to acquire or determine a current limit value of the switching device 103(i), including a soft-start current limit value and a current limit value during normal operation after startup (hereinafter referred to as an operation current limit value and labeled with $I_{CC}$). Generally, the soft-start current limit value may be set higher than the operation current limit value $I_{CC}$. For example, in an embodiment, the soft-start current limit value may be twice the operation current limit value $I_{CC}$. The following mainly discusses how to set and adjust the operation current limit value $I_{CC}$. The control and logic programming circuit may further be configured to adjust the operation current limit value $I_{CC}$ at any time according to detected values of the power supply voltage VIN and the output voltage VBUS(i) and/or based on system load regulation requirements. The operation current limit value $I_{CC}$ may be converted into an analog current limit reference signal by, for example, a digital-to-analog converter or converted into a digital current limit reference signal and then converted into an analog current limit reference signal by a discrete component. The controller 101 may output the current limit reference signal (in analog or digital form) at its ILIM(i) pin. The switching device 103(i) may be configured to correspondingly receive the current limit reference signal provided by the ILIM(i) pin of the controller 101 at the ILIM pin of the switching device 103(i). Optionally and alternatively, the operation current limit value $I_{CC}$ may be set or adjusted by coupling, for example, a resistive element having a resistance value of Rlim(i) to the ILIM pin of the switching device 103(i), as shown in the example of FIG. 6.

In the example of FIG. 1, for each i from 1 to N (the illustrated embodiment shows an example of N=3), the controller 101 may be configured to receive a supply current indication signal from the switching device 103(i). The supply current indication signal may be a current sensing signal IS output by the IMON pin of the switching device 103(i). In an embodiment, the current sensing signal IS may be a current signal proportional to the output current of the switching device 103(i) or proportional to a switching current flowing through the power switch (e.g. the power switch 102 shown in FIG. 1) in the switching device 103(i), and may be used for current sharing and over current protection control. The output current or the switching current flowing through the power switch may be sensed by coupling a current detection circuit to the power switch (e.g., the power switch 102 shown in FIG. 1) in the switching device 103(i) to provide the current sensing signal IS to the IMON pin. The IMON pin of each switching device 103(i) may also be used to receive a system current indication signal indicative of a real-time total output current of the system 100 (or indicative of a sum of the switching currents flowing through the power switches in the switching devices 103(i), e.g. i=1, 2, 3 in the example of FIG. 1). In one embodiment, the system current indication signal may be a current signal ISUM, and the current signal ISUM may be a sum of the current sensing signals IS of all the switching devices 103(i) in the system 100. In another embodiment, the system current indication signal may be a voltage signal VMON, and the voltage signal VMON may be obtained by converting the sum of the current sensing signals IS of all the switching devices 103(i) in the system 100 into a voltage signal. For example, in the example of FIG. 1, the IMON pin of each switching device 103(i) may be coupled to a resistive device 104, which has a resistance value RMON, and the current sensing signal IS of each switching device 103(i) applying on the resistive device 104 generates a voltage signal VMON that represents the total real-time output current of the system or the sum of the switching currents flowing through the power switches of all the switching devices 103(i) in the system 100. Hereinafter, the sum of the switching currents flowing through the power switches of all the switching devices 103(i) in the system 100 is referred to as a total switching current. In the example of FIG. 1, the voltage signal VMON at the IMON pin represents the total output current of all the three switching devices 103(i), i=1, 2, 3, or the total switching current of all the three switching devices 103(i), i=1, 2, 3, i.e., VMON=3*IS*RMON. Those skilled in the art should understand that in an example extended to the system 100 comprising N switching devices 103(i), i traverses the integers from 1 to N, and N is a positive integer, the voltage signal VMON at the IMON pin may be indicative of a total output current of the N switching devices 103(i), i=1, . . . , N or a total switching current (i.e., a sum of the switching currents flowing through the power switches of all the N switching devices 103(i)), i.e., for this situation, VMON=N*IS*RMON. The current sensing signal IS can provide the controller 101 with real-time output current information of each switching device 103(i) or current monitoring information of the switching current flowing through the power switch in each switching device 103(i), and the voltage signal VMON can provide real-time monitoring information of the total output current or total switching current of a plurality of (for example, N) switching devices 103(i) in the system 100.

In the exemplary embodiment of FIG. 1, for each i from 1 to N (the illustrated embodiment shows an example of N=3), the switching device 103(i) may further have a SYSLIM pin that may be configured to receive or set a system total current limit value ISYSLIM of the system 100 comprising the switching devices {103 (i), i=1, . . . , N}. A total system current ISYS of the system 100 may refer to the total current provided to the system 100 by the system power supply bus SYSPOL, and the system total current limit value ISYSLIM may be set according to a current supply capacity of the system power supply bus SYSPOL. For example, if the current supply capacity of the system power supply bus SYSPOL can reach 8 A, the system total current limit value ISYSLIM of the system 100 may be set to 8 A.

For each i from 1 to N (the illustrated embodiment shows an example of N=3), the SYSLIM pin of each switching device 103(*i*) may be coupled to an external circuit or component. For example, in one embodiment, the SYSLIM pin of each switching device 103(*i*) may be coupled to the controller 101 (for example, coupled to a SYSLIM pin of the controller 101) to receive a system current limit signal to set the system total current limit value ISYSLIM. In an embodiment, the system current limit signal may be a voltage signal. In one embodiment, the system current limit signal may be a current signal. In one embodiment, the SYSLIM pin of the switching device 103(*i*) may not receive the system current limit signal from the controller 101, but may simply be coupled to a resistive device 105 for setting the system total current limit value ISYSLIM of the system 100, as shown in the example illustrated in FIG. 5. According to an embodiment of the present invention, each switching device 103(*i*) may be configured to adaptively adjust the operation current limit value $I_{CC}$ of the switching device 103(*i*) based on the voltage signal VMON at its IMON pin and the system total current limit value ISYSLIM received or set at the SYSLIM pin. In an alternative embodiment, the ILIM pin of the switching device 103(*i*) may not receive the current limit reference signal from the controller 101. The switching device 103(*i*) may be configured to adaptively adjust the operation current limit value $I_{CC}$ of the switching device 103(*i*) to change in a same direction as the system total current limit value ISYSLIM, namely: the operation current limit value $I_{CC}$ of the switching device 103(*i*) increases as the system total current limit value ISYSLIM increases, and decreases as the system total current limit value ISYSLIM decreases. The switching device 103(*i*) may further be configured to adaptively adjust the operation current limit value $I_{CC}$ of the switching device 103(*i*) to change in an opposite direction to the system current indication signal received at the IMON pin (e.g. the system current indication signal may in an example comprise the current signal ISUM or in another example as shown in FIG. 1 comprise the voltage signal VMON), namely: the operation current limit value $I_{CC}$ of the switching device 103(*i*) increases as the system current indication signal decreases and decreases as the system current indication signal increases. In another alternative embodiment, the current limit reference signal received by the ILIM pin of the switching device 103(*i*) may be used to set or determine a maximum operation current limit value $I_{CCmax}$ of the switching device 103(*i*), for example, the maximum operation current limit value $I_{CCmax}$ may be set based on a rated operation current of the switching device 103(*i*) or a maximum current allowed to flow through the switching device 103(*i*) without causing the switching device 103(*i*) being damaged. When the operation current limit value $I_{CC}$ adaptively adjusted by the switching device 103(*i*) reaches the maximum operation current limit value $I_{CCmax}$, the switching device 103(*i*) may further be configured to stop adaptively adjusting the operation current limit value $I_{CC}$ to continue to increase based on the voltage signal VMON at the IMON pin and the system total current limit value ISYSLIM at the SYSLIM pin. That is, for this situation (i.e., when the operation current limit value $I_{CC}$ adaptively adjusted by the switching device 103(*i*) reaches the maximum operation current limit value $I_{CCmax}$), if the system total current limit value ISYSLIM continues to increase and/or the voltage signal VMON at the IMON pin continues to decrease, the switching device 103(*i*) no longer adaptively adjusts the operation current limit value $I_{CC}$ to increase but to keep or maintain the operation current limit value $I_{CC}$ at the maximum operation current limit value $I_{CCmax}$, however, the switching device 103(*i*) may still be able to adaptively adjust the operation current limit value $I_{CC}$ to decrease if the system total current limit value ISYSLIM decreases and/or the voltage signal VMON at the IMON pin increases.

In the exemplary embodiment of FIG. 1, for each i from 1 to N (the illustrated embodiment shows an example of N=3), the switching device 103(*i*) may be configured to receive/obtain the system current limit signal at its SYSLIM pin. The system current limit signal may be a voltage signal in one embodiment and may have a limiting voltage value VSYSLIM indicative of the system total current limit value ISYSLIM. The switching device 103(*i*) may comprise an adaptive adjustment module configured to adaptively adjust a current-limiting threshold voltage Vth, which is indicative of the operation current limit value $I_{CC}$ of the switching device 103(*i*), to change in a same direction as the limiting voltage value VSYSLIM, namely: the current-limiting threshold voltage Vth increases as the limiting voltage value VSYSLIM increases, and decreases as the limiting voltage value VSYSLIM decreases. The switching device 103(*i*) may further be configured to adaptively adjust the current-limiting threshold voltage Vth, for example by the adaptive adjustment module, to change in an opposite direction to the voltage signal VMON at the IMON pin, that is: the current-limiting threshold voltage Vth decreases when the voltage signal VMON increases, and increases when the voltage signal VMON decreases. In this fashion, the switching device 103(*i*) can realize adaptive adjustment of the operation current limit value $I_{CC}$ to change in the same direction as the system total current limit value ISYSLIM and to change in the opposite direction to the voltage signal VMON at the IMON pin. In one embodiment, the current-limiting threshold voltage Vth may be proportional to the operation current limit value $I_{CC}$ of the switching device 103(*i*) with a predetermined first coefficient K1, namely: Vth=K1*$I_{CC}$, wherein the predetermined first coefficient K1 is greater than zero. In one embodiment, the switching device 103(*i*) may be configured to adaptively adjust the current-limiting threshold voltage Vth to satisfy: Vth=K2*VSYSLIM−K3*VMON, wherein K2 is a predetermined second coefficient and is greater than zero, and K3 is a predetermined third coefficient greater than zero.

Figure 2:
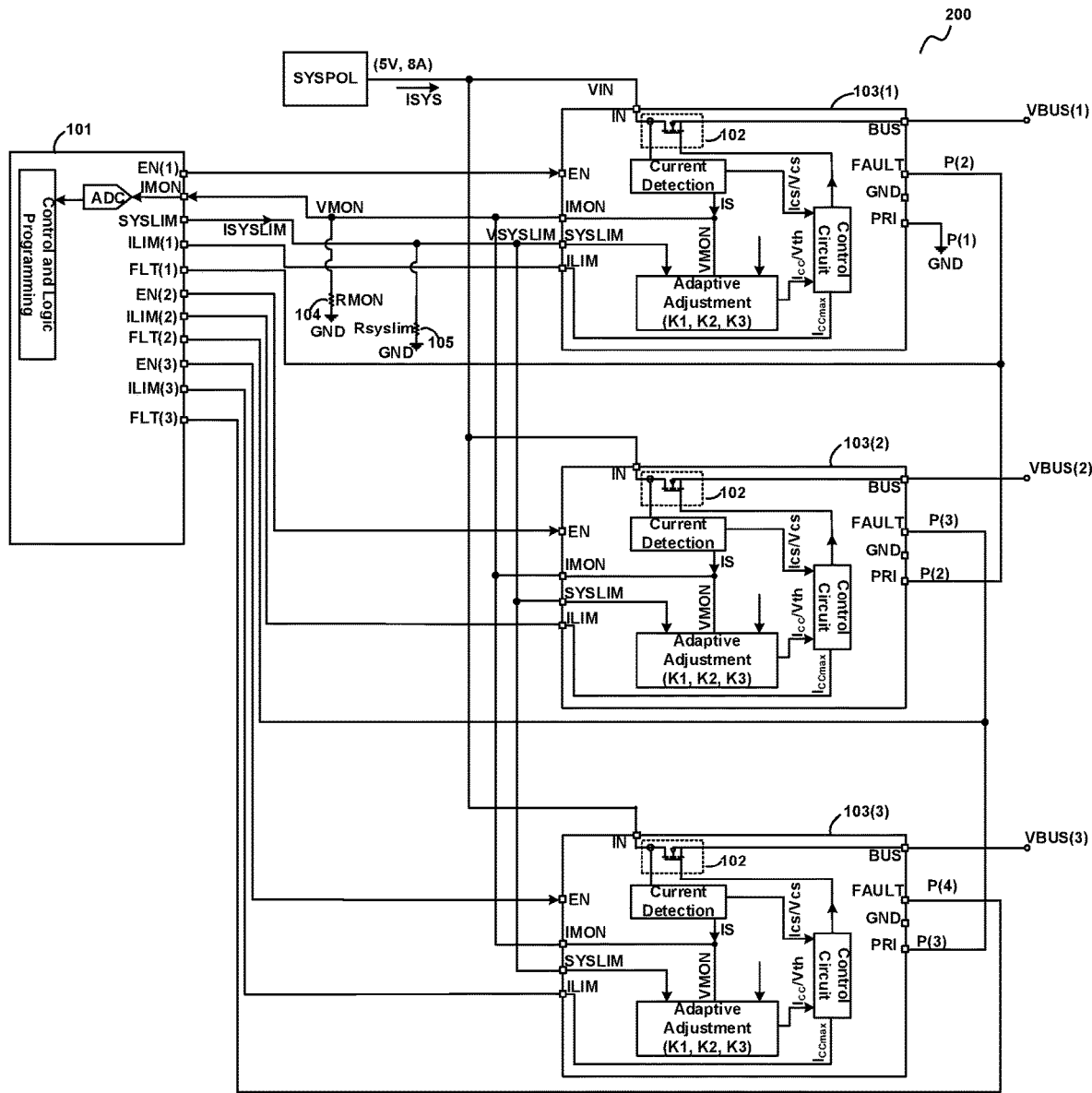
FIG. 2 illustrates a block diagram of a system 200 for connecting a power supply to a load in accordance with an embodiment of the present invention.

In one embodiment, as shown in the exemplary system 200 illustrated in FIG. 2, difference from the example shown in FIG. 1 is that the system current limit signal received at the SYSLIM pin of each switching device 103(*i*) may be a current signal, and may have the system total current limit value ISYSLIM. For this situation, in one embodiment, a resistive device 105 having a resistance value of Rsyslim may be coupled between the SYSLIM pin and the reference ground GND to convert the system current limit signal into a voltage signal, which may have a limiting voltage value VSYSLIM indicative of the system total current limit value ISYSLIM, wherein VSYSLIM=ISYSLIM*Rsyslim. Similar to the embodiment illustrated in FIG. 1, according to the embodiment illustrated in FIG. 2, for each i from 1 to N (the illustrated embodiment shows an example of N=3), each switching device 103(*i*) may be configured to adaptively adjust the current limiting threshold voltage Vth, for example by the adaptive adjustment module, to change in a same direction as the limiting voltage value VSYSLIM, namely: the current-limiting threshold voltage Vth increases as the limiting voltage value VSYSLIM increases, and decreases as the limiting voltage value VSYSLIM decreases. The switching device 103(i) may further be configured to adaptively adjust the current-limiting threshold voltage Vth, for example by the adaptive adjustment module, to change inversely with the voltage signal VMON at the IMON pin, that is: the current-limiting threshold voltage Vth decreases when the voltage signal VMON increases, and increases when the voltage signal VMON decreases. In this fashion, the switching device 103(i) can realize adaptive adjustment of the operation current limit value $I_{CC}$ to change in the same direction as the system total current limit value ISYSLIM and to change in the opposite direction to the voltage signal VMON at the IMON pin. In one embodiment, the current-limiting threshold voltage Vth may be proportional to the operation current limit value $I_{CC}$ of the switching device 103(i) with a predetermined first coefficient K1, namely: Vth=K1*$I_{CC}$, wherein the predetermined first coefficient K1 is greater than zero. In one embodiment, the switching device 103(i) may be configured to adaptively adjust the current-limiting threshold voltage Vth to satisfy: Vth=K2*VSYSLIM−K3*VMON, wherein K2 is a predetermined second coefficient and is greater than zero, and K3 is a predetermined third coefficient greater than zero.

Figure 3:
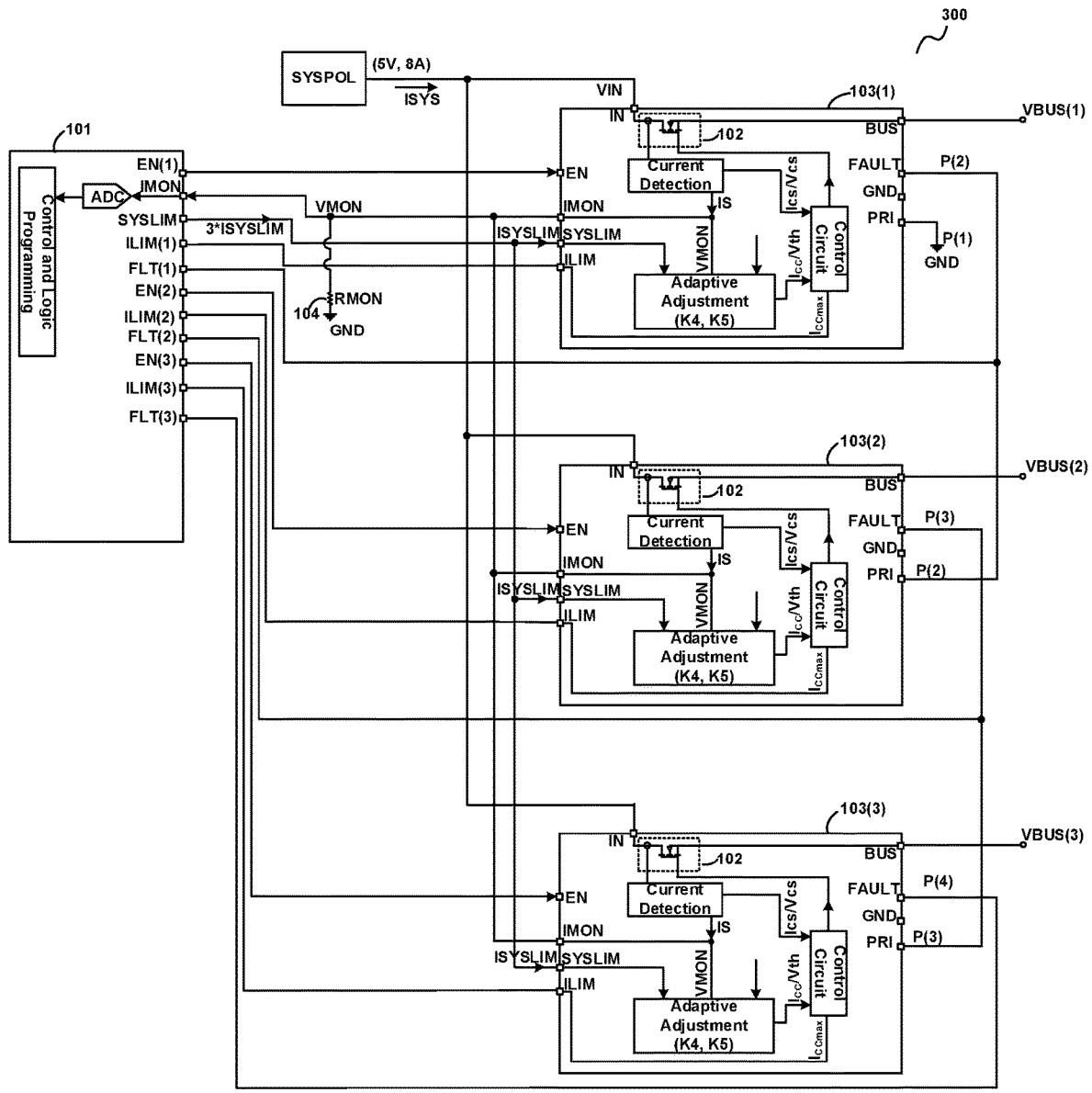
FIG. 3 illustrates a block diagram of a system 300 for connecting a power supply to a load in accordance with an embodiment of the present invention.

In an alternative one embodiment, as shown in the exemplary system 300 illustrated in FIG. 3, the system current limit signal received at the SYSLIM pin of each switching device 103(i) may still be a current signal. Difference from the example of FIG. 2 is that in the example of FIG. 3, the resistive device 105 may not be coupled to the SYSLIM pin of each switching device 103(i), the system current limit signal received by the SYSLIM pin of each switching device 103(i) may have the system total current limit value ISYSLIM, and consequently the controller 101 needs to provide a current signal having a current value of N times the system total current limit value ISYSLIM (i.e. N*ISYSLIM) by a single SYSLIM pin of the controller 101 for being equally divided and distributed to the N switching device 103(i), N=3 in the example illustrated in FIG. 3. Then each switching device 103(i) may adjust the operation current limit value $I_{CC}$ of the switching device 103(i) to change in the same direction as the system total current limit value ISYSLIM and to change in the opposite direction to the voltage signal VMON at the IMON pin through, for example, an adaptive adjustment module. In one embodiment, the switching device 103(i) may be configured to adaptively adjust the operation current limit value $I_{CC}$ to satisfy: $I_{CC}$=K4*ISYSLIM-K5*VMON, where K4 is a predetermined fourth coefficient and is greater than zero, K5 is a predetermined fifth coefficient and is greater than zero.

Figure 4:
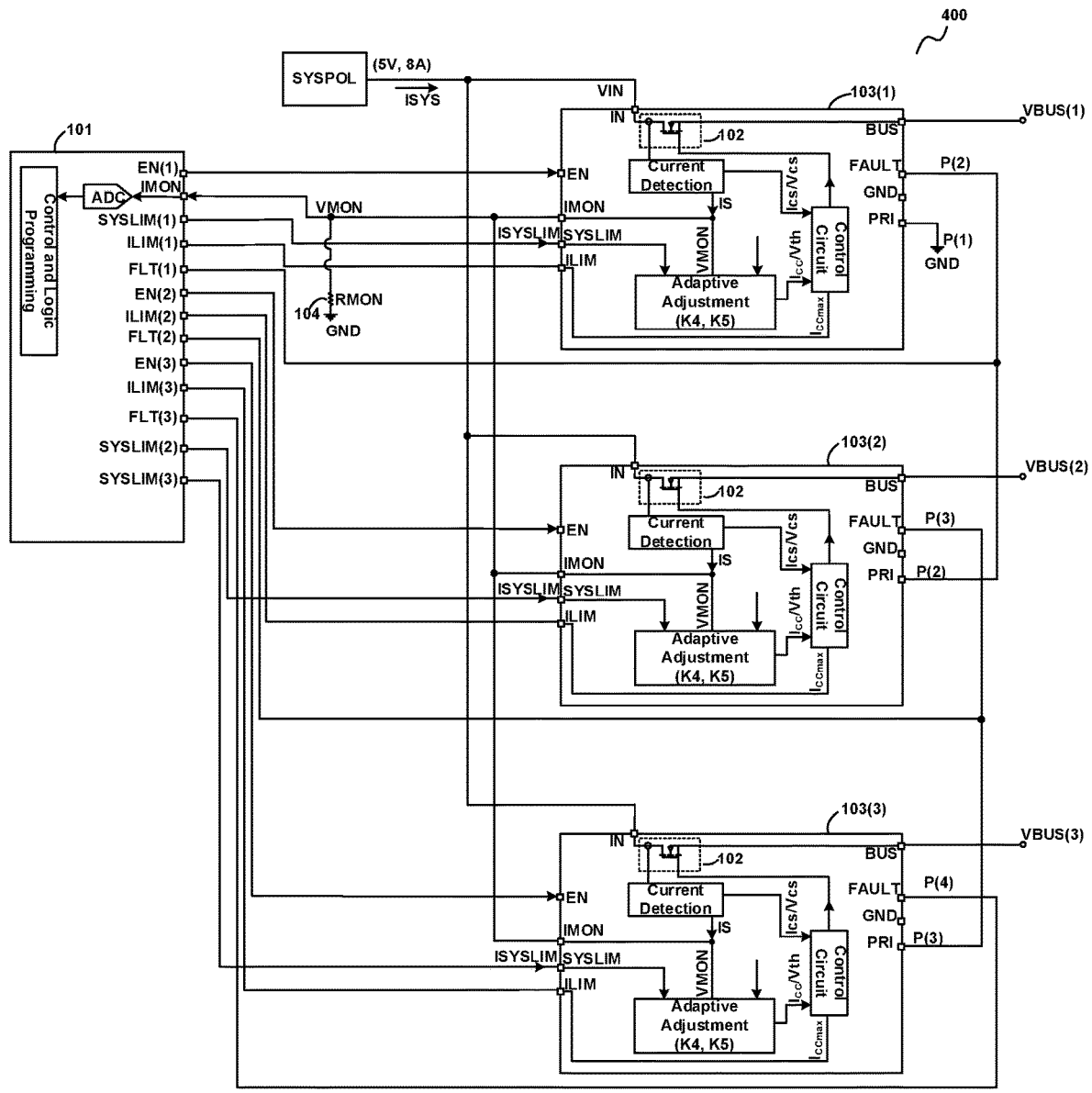
FIG. 4 illustrates a block diagram of a system 400 for connecting a power supply to a load in accordance with an embodiment of the present invention.

In one embodiment, as shown in the exemplary system 400 illustrated in FIG. 4, as an alternative example with slightly modification to the example of FIG. 3, when the system current limit signal is a current signal, the controller 101 may have N pins SYSLIM(i) respectively connected to the SYSLIM pin of the N switching devices 103(i), i traverses the integers from 1 to N (FIG. 4 illustrates an example of N=3). For this situation, for each i from 1 to N, the SYSLIM(i) pin of the controller 101 may provide a system current limit signal having the system total current limit value ISYSLIM to the SYSLIM pin of the switching devices 103(i). Then each switching device 103(i) may adjust the operation current limit value $I_{CC}$ of the switching device 103(i) to change in the same direction as the system total current limit value ISYSLIM and to change in the opposite direction to the voltage signal VMON at the IMON pin through, for example, the adaptive adjustment module.

In one embodiment, the switching device 103(i) may be configured to adaptively adjust the operation current limit value $I_{CC}$ to satisfy: $I_{CC}$=K4*ISYSLIM-K5*VMON, where K4 is a predetermined fourth coefficient and is greater than zero, K5 is a predetermined fifth coefficient and is greater than zero.

Figure 5:
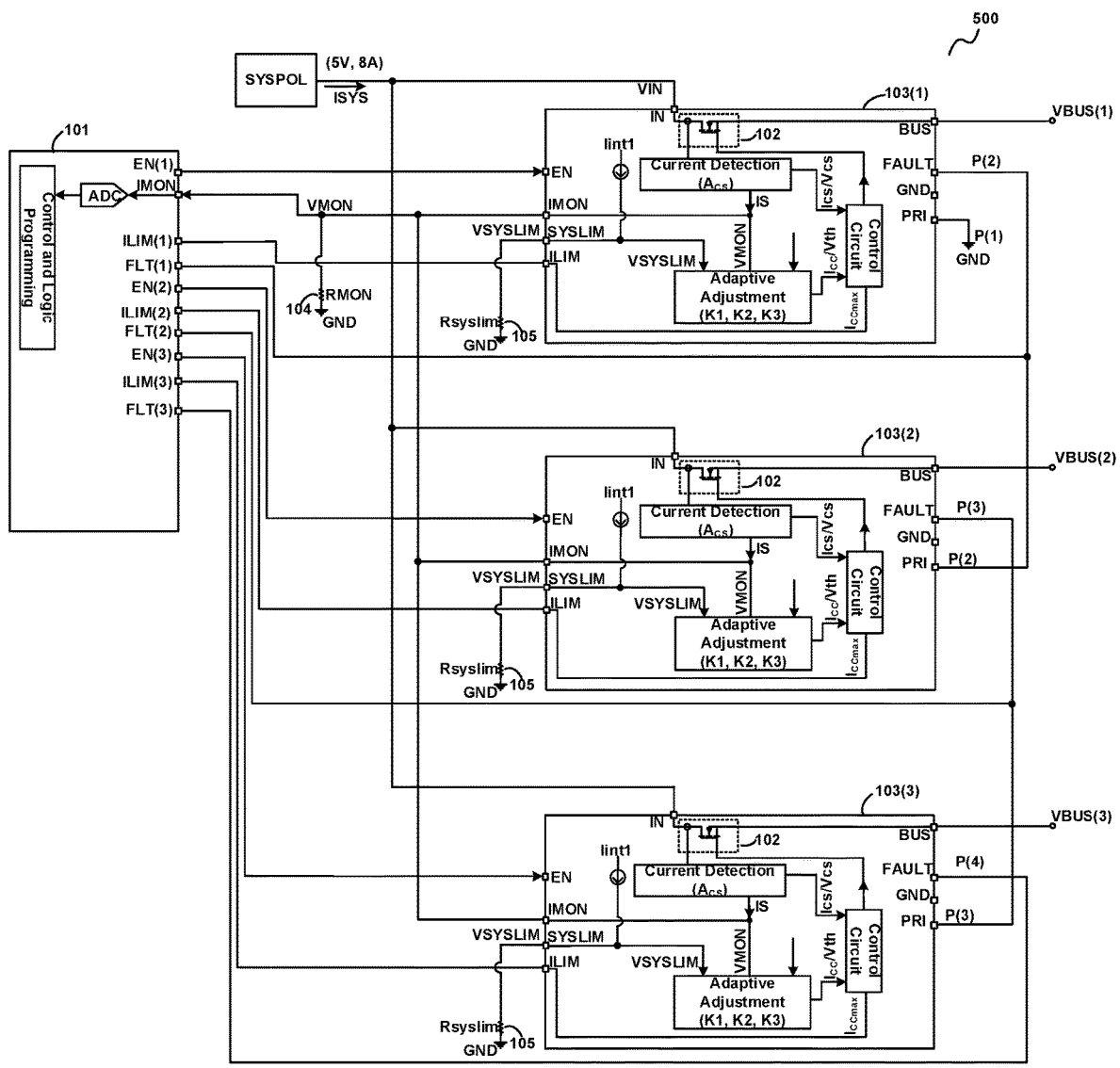
FIG. 5 illustrates a block diagram of a system 500 for connecting a power supply to a load in accordance with an embodiment of the present invention.

In one embodiment, as shown in the exemplary system 500 illustrated in FIG. 5, difference from the examples of FIG. 1 to FIG. 4 is that in the example of FIG. 5, for each i from 1 to N (the illustrated embodiment shows an example of N=3), the SYSLIM pin of each switching device 103(i) may not receive the system current limit signal from the controller 101, but may simply be coupled to a resistive device 105 having a resistance value of Rsyslim for setting the system total current limit value of ISYSLIM. In one embodiment, an internal current source with a first predetermined current value Iint1 (for example, the first predetermined current value may be 20 µA in one example) may be used to drive the SYSLIM pin of the switching device 103(i), then Iint1*Rsyslim defines the limiting voltage value VSYSLIM (i.e., VSYSLIM=Iint1*Rsyslim for this situation) which is indicative of the system total current limit value ISYSLIM. The internal current source is "internal" in that it is integrated in the switching device 103(i). In practical applications, the resistance value Rsyslim of the resistive device 105 may be reasonably selected according to the system total current limit value ISYSLIM required for example by application specifications. The resistance value Rsyslim of the resistive device 105 should satisfy: Rsyslim=RMON*ISYSLIM/Iint1*$A_{CS}$, wherein $A_{CS}$ is a current sensing gain of the current detection circuit of each switching device 103(i). For example, if Iint1=20 µA, $A_{CS}$=10 µA/A, RMON=20 kΩ, and the system total current limit value ISYSLIM needs to be set to 7 A, then Rsyslim should be selected as 70 kΩ. Similar to the embodiment illustrated in FIG. 1, in the embodiment illustrated in FIG. 5, for each i from 1 to N (the illustrated embodiment shows an example of N=3), each switching device 103(i) may be configured to adjust the current limiting threshold voltage Vth that is indicative of the operation current limit value $I_{CC}$ of the switching device 103(i) to change in the same direction as the limiting voltage value VSYSLIM and to change in the opposite direction to the voltage signal VMON at the IMON pin, for example, through the adaptive adjustment module. In one embodiment, the current-limiting threshold voltage Vth may be proportional to the operation current limit value $I_{CC}$ of the switching device 103(i) with a predetermined first coefficient K1, namely: Vth=K1*$I_{CC}$, wherein the predetermined first coefficient K1 is greater than zero. In one embodiment, the switching device 103(i) may be configured to adaptively adjust the current-limiting threshold voltage Vth to satisfy: Vth=K2*VSYSLIM−K3*VMON, wherein K2 is a predetermined second coefficient and is greater than zero, and K3 is a predetermined third coefficient greater than zero.

In one embodiment, as shown in the exemplary system 600 illustrated in FIG. 6, difference from the example of FIG. 5 is that in the example of FIG. 6, for each i from 1 to N (the illustrated embodiment shows an example of N=3), the ILIM pin of each switching device 103(i) may not receive the current limit reference signal from the ILIM(i) pin of the controller 101, but may instead be coupled to an $i^{th}$ resistive element having a resistance value Rlim(i) to set or adjust the maximum operation current limit value $I_{CCmax}$ of the switching device 103(i). Although the example shown in FIG. 6 is based on the circuit architecture of FIG. 5 by modifying the connection of the ILIM pin of the switching device 103(*i*), those skilled in the art should understand that this modification may be applied to other embodiments of the present invention. In one embodiment, each switching device 103(*i*) may comprise an internal current source having a second predetermined current value Iint2 (for example, the second predetermined current value Iint2 may be 10 μA in one example) configured to drive the ILIM pin of the switching device 103(*i*), then Iint2*Rlim(i) defines a maximum operating current limit voltage value VLIM(i) (i.e., VLIM(i)=Iint2*Rlim(i) for this situation) that represents the maximum operation current limit value $I_{CCmax}$ of the switching device 103(*i*).

In accordance with an exemplary embodiment of the present invention, referring to the examples illustrated in FIG. 1 to FIG. 6, for each i from 1 to N (the illustrated embodiments show an examples of N=3), the switching device 103(*i*) may further comprise a priority pin PRI, which may be configured or used to set a turn-off sequence/turn-off priority of the switching device 103(*i*) when over-current occurs in the system (e.g., 100 or 200 or 300 or 400 or 500 or 600) or in other words when the total output current of the N switching devices {103(*i*), i=1, N} or the sum of the switching currents flowing through the power switches of the N switching devices {103(*i*), i=1, N} reaches the system total current limit value ISYSLIM.

For example, in one embodiment, the priority pin PRI of the switching device (e.g. the switching device 103(1) in the examples in FIGS. 1 to 6) which is to be turned off at first when an over-current occurs in the system (e.g., 100 or 200 or 300 or 400 or 500 or 600) may be coupled to a first predetermined potential P(1) to set the switching device (e.g. the switching device 103(1) in the examples in FIGS. 1 to 6) to have a first turn-off priority. The switching device which is set to have the first turn-off priority may also be referred to as a first turn-off priority switching device in the following. If an over-current occurs in the system (e.g., 100 or 200 or 300 or 400 or 500 or 600), the switching device with the first turn-off priority (that is, the switching device of which the PRI pin is coupled to the first predetermined potential P(1), e.g., the switching device 103(1) shown in the examples in FIGS. 1 to 6) is turned off first, and at the same time, the switching device with the first turn-off priority (e.g., the switching device 103(1) shown in the examples in FIGS. 1 to 6) is further configured to set its FAULT pin at a second predetermined potential P(2) in response to its turn-off. The second predetermined potential P(2) may be equal to or different from the first predetermined potential P(1). The exemplary embodiments in FIGS. 1 to 6 show the case where both the first predetermined potential P(1) and the second predetermined potential P(2) are set at the reference ground potential. The FAULT pin of the switching device with the first turn-off priority (e.g., the switching device 103(1) illustrated in the embodiments of FIGS. 1 to 6) may be coupled to the PRI pin of the switching device (shown as the switching device 103(2) in the examples of FIGS. 1 to 6 for ease of understanding) which is to be set to have a second turn-off priority, so as to transmit the second predetermined potential P(2) to the PRI pin of the switching device (e.g., the switching device 103(2)) to be set to have the second turn-off priority. The switching device which is set to have the second turn-off priority may be referred to as a second turn-off priority switching device in the following. In other words, it may be considered as that after the switching device having the first turn-off priority (for example, the switch device 103(1)) is turned off, its turn-off priority is passed to the switching device having the second turn-off priority (for example, the switching device 103(2)).

It can also be understood as that a turn-off priority handshaking between the first turn-off priority switching device (such as switching device 103(1)) and the second turn-off priority switching device (such as switching device 103(2)) may be established by coupling the FAULT pin of the first turn-off priority switching device (such as the switching device 103(1)) to the PRI pin of the second turn-off priority switching device (such as the switching device 103(2)) so that the turn-off priority may be passed to the second turn-off priority switching device (such as the switching device 103(2)) when the first turn-off priority switching device is turned off.

Then, after the first turn-off priority switching device (for example, the switching device 103(1)) is turned off, if the over-current remains in the system (e.g., 100 or 200 or 300 or 400 or 500 or 600) or another over-current occurs (i.e.: if the total output current of those switching devices that are not turned off in the N switching devices {103(*i*), i=1, . . . , N} or the sum of the switching currents flowing through the power switches of those switching devices that are not turned off in the N switching devices {103(*i*), i=1, . . . , N} reaches the system total current limit value ISYSLIM), then the switching device of which the PRI pin has the second predetermined potential of P(2) (that is, the switching device which is set to the second turn-off priority, for example, the switching device 103(2) in the examples of FIG. 1 to FIG. 6) will be turned off. That is to say, the turn-off sequence of the switching device having the second turn-off priority is one later than that of the switching device having the first turn-off priority, or the turn-off priority is one stage lower. The second turn-off priority switching device (that is, the switching device whose turn-off sequence is the second with respect to the switching device whose turn-off sequence is the first, for example, the switching device 103(2)) may further be configured to set its FAULT pin (that is, the fault indication pin) at a third predetermined potential P(3) in response to its turn-off. The third predetermined potential P(3) may be equal to or different from the first predetermined potential P(1) and/or second predetermined potential P(2). The exemplary embodiments in FIGS. 1 to 6 show the case where the first predetermined potential P(1), the second predetermined potential P(2) and the third predetermined potential P(3) are all set to the reference ground potential). The FAULT pin of the switching device with the second turn-off priority (e.g., the switching device 103(2) illustrated in the embodiments of FIGS. 1 to 6) may be coupled to the PRI pin of the switching device (shown as the switching device 103(3) in the examples of FIGS. 1 to 6 for ease of understanding) which is to be set to have a third turn-off priority, so as to transmit the third predetermined potential P(3) to the PRI pin of the switching device (e.g., the switching device 103(3)) to be set to have the third turn-off priority. The switching device which is set to have the third turn-off priority may also be referred to as a third turn-off priority switching device in the following. In other words, it may be considered as that after the switching device having the second turn-off priority (for example, the switch device 103(2)) is turned off, its turn-off priority is passed to the switching device having the third turn-off priority (for example, the switching device 103(3)). It can also be understood as that a turn-off priority handshaking between the second turn-off priority switching device (such as switching device 103(2)) and the third turn-off priority switching device (such as switching device 103(3)) may be established by coupling the FAULT pin of the second turn-off priority switching device (such as the switching device 103(2)) to the PRI pin of the third turn-off priority switching device (such as the switching device 103(3)) so that the turn-off priority may be passed to the third turn-off priority switching device (such as the switching device 103(3)) when the second turn-off priority switching device is turned off.

By analogy, those skilled in the art should understand that it can be extended to the case where the system (e.g., 100 or 200 or 300 or 400 or 500 or 600) includes N switching devices 103(i), where i traverses the integers from 1 to N, and N is a positive integer. The PRI pin of the switching device which is to be turned off at first (referred to as the first turn-off priority switching device) when an over-current occurs in the system may be coupled to a first predetermined potential P(1) (e.g. the first predetermined potential P(1) is exemplarily set at the reference ground potential in the examples from FIG. 1 to FIG. 6). If an overcurrent occurs in the system, the switching device with the first turn-off priority is turned off first, and the switching device with the first turn-off priority set its FAULT pin (that is, the fault indication pin) at a second predetermined potential P(2) in response to its turn-of. The second predetermined potential P(2) may be the same as or different from the first predetermined potential P(1), for example, the first predetermined potential P(1) and the second predetermined potential P(2) are both set to the reference ground potential in the examples from FIG. 1 to FIG. 6. If N is greater than 1, for each j=2, . . . , N, the PRI pin of a switching device which is to be turned off at $j^{th}$ (referred to as the $j^{th}$ turn-off priority switching device) may be coupled to the FAULT pin of a switching device that is turned off at $(j-1)^{th}$ (referred to as the $(j-1)^{th}$ turn-off priority switching device), and the $j^{th}$ turn-off priority switching device may be configured to set its FAULT pin at a $(j+1)^{th}$ predetermined potential P(j+1) in response to its turn-off (i.e. in response to the moment when the $j^{th}$ turn-off priority switching device is turned off). Therefore, the system (e.g., 100 or 200 or 300 or 400 or 500 or 600) may include N predetermined potentials {P(j), j=1, . . . , N}, and the N predetermined potentials P(j) (j traverses from 1 to N) may be equal to each other or different from each other. It can also be understood as that a turn-off priority handshaking between the $j^{th}$ turn-off priority switching device and the $(j+1)^{th}$ turn-off priority switching device may be established by coupling the FAULT pin of the $j^{th}$ turn-off priority switching device to the PRI pin of the $(j+1)^{th}$ turn-off priority switching device so that the turn-off priority may be passed to the $(j+1)^{th}$ turn-off priority switching device when the $j^{th}$ turn-off priority switching device is turned off, for each j from 1 to (N−1).

The present disclosure provides single-chip integrated circuit switching devices and systems including monolithic (or single-chip) integrated circuit switching devices for current limiting and turn-off priority setting when the system is over-current. Although some embodiments of the present invention are described in detail, it should be understood that these embodiments are only used for exemplary description, and are not used to limit the scope of the present invention. Various modifications may be made without deviating from the technology. The advantages of the various embodiments of the present invention are not confined to those described above. These and other advantages of the various embodiments of the present invention will become more apparent upon reading the whole detailed descriptions and studying the various figures of the drawings. Many of the elements of one embodiment may be combined with other embodiments in addition to or in lieu of the elements of the other embodiments. Accordingly, the present invention is not limited except as by the appended claims.

What is claimed is:

1. A smart switch system, comprising:
a plurality of switching devices, wherein
each one switching device of the plurality of switching devices comprises a first pin, a second pin, a current indication pin, a system current limit pin and a power switch coupled between the first pin and the second pin, and wherein the current indication pin is configured to receive a system current indication signal indicative of a real-time total output current of the smart switch system, and wherein the system current limit pin is configured to receive or set a system total current limit value ISYSLIM of the smart switch system, and wherein
each one switching device of the plurality of switching devices has an operation current limit value $I_{CC}$ and is further configured to adaptively adjust its operation current limit value $I_{CC}$ to change in a same direction as the system total current limit value ISYSLIM, and is further configured to adaptively adjust its operation current limit value $I_{CC}$ to change in an opposite direction to the system current indication signal.

2. The smart switch system of claim 1, wherein:
each one switching device of the plurality of switching devices is further configured to provide a current sensing signal indicative of a switching current flowing through the power switch to its current indication pin.

3. The smart switch system of claim 1, wherein:
the current indication pin of each one switching device of the plurality of switching devices is coupled to a resistive device.

4. The smart switch system of claim 1, wherein:
each one switching device of the plurality of switching devices is further configured to receive a system current limit signal at the system current limit pin to set the system total current limit value ISYSLIM.

5. The smart switch system of claim 4, wherein the system current limit signal comprises a voltage signal having a limiting voltage value VSYSLIM indicative of the system total current limit value ISYSLIM.

6. The smart switch system of claim 4, wherein the system current limit signal comprises a current signal having the system total current limit value ISYSLIM, and wherein a resistive device having a resistance value of Rsyslim is coupled to the system current limit pin of each one switching device of the plurality of switching devices to convert the system current limit signal into a voltage signal having a limiting voltage value VSYSLIM indicative of the system total current limit value ISYSLIM, and wherein VSYSLIM=ISYSLIM*Rsyslim.

7. The smart switch system of claim 1, wherein:
each one switching device of the plurality of switching devices is further configured to be coupled to a resistive device having a resistance value of Rsyslim at the system current limit pin, an internal current source in each one switching device is configured to drive its system current limit pin with a first predetermined current value Iint1 to generate a limiting voltage value VSYSLIM indicative of the system total current limit value ISYSLIM, and wherein VSYSLIM=Iint1*Rsyslim.

8. The smart switch system of claim 1, wherein the system total current limit value ISYSLIM is set to be proportional to a limiting voltage value VSYSLIM, and wherein each one switching device of the plurality of switching devices comprises an adaptive adjustment module configured to adaptively adjust a current-limiting threshold voltage Vth to change in a same direction as the limiting voltage value VSYSLIM and to change in an opposite direction to the system current indication signal, and wherein the current-limiting threshold voltage Vth is indicative of the operation current limit value $I_{CC}$.

9. The smart switch system of claim 8, wherein the current-limiting threshold voltage Vth is proportional to the operation current limit value $I_{CC}$ with a predetermined first coefficient K1, and wherein the predetermined first coefficient K1 is greater than zero.

10. The smart switch system of claim 9, wherein the system current indication signal comprises a voltage signal VMON, and wherein the adaptive adjustment module is configured to adaptively adjust the current-limiting threshold voltage Vth to satisfy: Vth=K2*VSYSLIM−K3*VMON, and wherein K2 is a predetermined second coefficient greater than zero, and wherein K3 is a predetermined third coefficient greater than zero.

11. The smart switch system of claim 4, wherein the system current limit signal comprises a current signal having the system total current limit value ISYSLIM, and wherein the system current indication signal comprises a voltage signal VMON, and wherein each one switching device of the plurality of switching devices comprises an adaptive adjustment module configured to adaptively adjust the operation current limit value $I_{CC}$ to satisfy: $I_{CC}$=K4*ISYSLIM−K5*VMON, and wherein K4 is a predetermined fourth coefficient greater than zero, and wherein K5 is a predetermined fifth coefficient greater than zero.

12. The smart switch system of claim 4, wherein the system current limit signal comprises a current signal having the system total current limit value ISYSLIM, and wherein the system current limit pins of all the plurality of switching devices are coupled to a single pin of a controller or the system current limit pin of each one of the plurality of switching devices is coupled to a corresponding one pin of a corresponding plurality of pins of a controller.

13. The smart switch system of claim 1, wherein the operation current limit value $I_{CC}$ stops increasing when it reaches a maximum operation current limit value.

14. The smart switch system of claim 13, wherein each one switching device of the plurality of switching devices further comprises a switching current limit setting pin configured to receive or set the maximum operation current limit value.

15. The smart switch system of claim 1, wherein each one switching device of the plurality of switching devices further comprises a priority pin configured or used to set its turn-off priority when an over-current occurs in the smart switch system.

16. The smart switch system of claim 15, wherein each one switching device of the plurality of switching devices further comprises a fault indication pin configured to indicate system faults.

17. The smart switch system of claim 16, wherein a first turn-off priority switching device which is to be turned off at first among the plurality of switching devices when an over-current occurs in the smart switch system is coupled to a first predetermined potential at its priority pin.

18. The smart switch system of claim 17, wherein the first turn-off priority switching device is further configured to set its fault pin at a second predetermined potential in response to its turn-off.

19. The smart switch system of claim 18, wherein if the number of the plurality of switching devices is greater than 1, the priority pin of a second turn-off priority switching device which is to be turned off at second among the plurality of switching devices is coupled to the fault pin of the first turn-off priority switching device, and the second turn-off priority switching device is further configured to set its fault pin at a third predetermined potential in response to its turn-off.

* * * * *